United States Patent [19]

Osgood, Jr. et al.

[11] Patent Number: 4,855,187
[45] Date of Patent: Aug. 8, 1989

[54] LOW COEFFICIENT OF FRICTION BIAXIALLY ORIENTED FILM

[75] Inventors: Wayne R. Osgood, Jr., Farmington; Matthew A. Therrian, Newark, both of N.Y.

[73] Assignee: Mobil Oil Corporation, New York, N.Y.

[21] Appl. No.: 191,107

[22] Filed: May 6, 1988

[51] Int. Cl.$^4$ .............................................. B32B 27/08
[52] U.S. Cl. ................................. 428/516; 428/349; 428/916; 428/332; 156/244.11
[58] Field of Search ............... 428/516, 913, 349, 336; 525/240; 156/244.11

[56] References Cited

U.S. PATENT DOCUMENTS

| | | | |
|---|---|---|---|
| 4,419,411 | 12/1983 | Park | 428/516 |
| 4,460,631 | 7/1984 | Stegmeier et al. | 428/516 |
| 4,481,058 | 11/1984 | Park | 428/516 |
| 4,505,969 | 3/1985 | Weiner | 428/213 |
| 4,522,887 | 6/1985 | Koebisy et al. | 428/516 |
| 4,564,558 | 1/1986 | Touhsaent et al. | 428/516 |
| 4,578,316 | 3/1986 | Clauson et al. | 428/516 |
| 4,590,020 | 5/1986 | Itaba et al. | 264/22 |
| 4,636,340 | 1/1987 | Itaba et al. | 264/22 |
| 4,673,619 | 6/1987 | Itaba et al. | 428/338 |

*Primary Examiner*—Edith Buffalow
*Attorney, Agent, or Firm*—Alexander J. McKillop; Charles J. Speciale

[57] ABSTRACT

Oriented multi-layer polypropylene films having low coefficients of friction and good optical properties (haze and gloss) are disclosed. The films of this invention comprise at least a first surface layer of a material consisting essentially of HDPE and a second layer of a material consisting essentially of polypropylene, said film being oriented by stretching at a temperature above the melting point of the material of said first surface layer and below the melting point of the material of said second layer.

25 Claims, No Drawings

LOW COEFFICIENT OF FRICTION BIAXIALLY ORIENTED FILM

BACKGROUND OF THE INVENTION

This invention relates to a multi-layer polypropylene film having a low film to film coefficient of friction.

Highly crystalline polypropylene film is an excellent packaging material, but it has a high film to film coefficient of friction which makes it difficult or impossible for it to be successfully utilized in automatic packaging equipment. The film will not respond to the packaging speed capability of the system and, as a consequence, jamming results.

In the past, the coefficient of friction characteristics of polypropylene films have been beneficially modified by the inclusion in the polymer of coefficient of friction (COF) additives such as, for example, fatty acid amides. The effectiveness of an amide depends upon its ability to migrate to the surface of the films in order to reduce COF. While such amides do improve the COF of the films, the value of the COF is subject to wide variation depending upon the heat history which the film experiences during storage, shipping and certain converting processes. The presence of such amides on the film surfaces can adversely affect the film's appearance as manifested by an increase in haze, a decrease in gloss and the presence of streaks. The presence of such amides on the surface can also adversely affect the wettability and adhesion of solvent and water base inks, coatings, adhesives and metals.

In an effort to improve the COF of polypropylene films without adversely affecting the films' appearance, wetting and adhesion, it has been proposed to prepare a polypropylene film having on at least one surface thereof a layer of a blend of (1) a member selected from the group consisting of a medium density polyethylene (MDPE), a high density polyethylene (HDPE) and mixtures thereof, and (2) polypropylene. (U.S. Pat. No. 4,578,316 to Clauson et al.) This patent discloses that the two materials in the surface layer can be blended in a percent by weight of from about 2% by weight to about 60% by weight of the medium or high density polyethylene with the remainder being the polypropylene. The patent also suggests that at percentages of 60 to 100% MDPE or HDPE, the surface layers are too soft and too hazy. That such high (MDPE or HDPE) content films would have comparatively inferior optical properties is not unexpected, because MDPE and HDPE films are known to be hazy and opaque.

SUMMARY OF THE INVENTION

Novel oriented polypropylene film structures having low coefficients of friction and good optical properties have now been discovered. Unexpectedly, in view of the teachings of Clauson et al., it has been found that oriented polypropylene films having a surface layer of high HDPE content but also having good optical properties can be prepared by orienting the film at a temperature above the melting point of the HDPE but below the melting point of the polypropylene.

This invention therefore relates to oriented multi-layer films comprising at least a first surface layer of a material consisting essentially of HDPE and a second layer of a material consisting essentially of polypropylene, said film being oriented by stretching at a temperature above the melting point of the material of said first surface layer and below the melting point of the material of said second layer.

This invention further relates to a method of preparing an oriented multi-layer polypropylene film having low coefficient of friction and good optical properties comprising stretching a multi-layer film comprising at least a first surface layer of a material consisting essentially of HDPE and a second layer of a material consisting essentially of polypropylene at a temperature above the melting point of the material of said first surface layer and below the melting point of the material of said second layer.

It is an object of this invention to provide a multilayer polypropylene film having a comparatively low coefficient of friction, as compared with the unmodified film, without the use of prior COF additives or anti-block agents.

It is a further object of this invention to provide a film having improved COF characteristics which are stable with regard to the converting heat history of the film.

It is a further object of this invention to provide a film having improved COF characteristics without the adverse affects on appearance, wetting and adhesion typically experienced with additive-modified films.

It is a further object of this invention to provide a film having improved COF characteristics, as compared with the unmodified film, and good optical properties, i.e., low haze and high gloss characteristics.

These and other objectives will become clear from the following detailed description of the invention.

DETAILED DESCRIPTION OF THE INVENTION

The polypropylenes which can be used to prepare the films of this invention are well known in the art. They are generally formed by polymerizing propylene in the presence of stereospecific catalyst systems. These polypropylenes can have a melt flow rate ranging from about 1 to about 25, preferably 1 to 8. The crystalline melting point of these materials is about 321°–336° F. The number average molecular weight ranges from about 25,000 to about 100,000. The density ranges from about 0.90–0.91. Although it is preferred to use a pure polypropylene layer in the films of this invention, the polypropylene may also be modified, e.g., by copolymerization with small amounts of another monomer or by blending with another material, so long as the melting point of the resulting material is sufficiently above that of the HDPE layer to allow for orientation of the film at a temperature between the melting points of the materials of the two layers.

The comparatively low COF material of which the surface layer is comprised is high density polyethylene. For the purposes of this invention, the high density polyethylenes are those having a density of from about 0.941 to about 0.965 and a melt index of from about 0.5 to about 18. It is preferred that at least one surface layer of the film consist solely of HDPE; however, the HDPE may be blended with other materials, e.g., polypropylene or MDPE, so long as the melting point of the blend is sufficiently below that of the polypropylene layer to allow for orientation of the film at a temperature between those two melting points.

The preferred films of this invention are two or three layer films having the configuration A/B, A/B/A or A/B/C where A is the HDPE layer, B is the polypropylene layer, and C is one or more of any number of functional layers (e.g., sealant). Additional layers of polymer may be incorporated in these films, however. For example, tie layers of adhesives may be used to add other functional or cost reduction layers. An example of a preferred third layer is a layer of ethylene/propylene copolymer, terpolymer (e.g., with 1-butene) or blends thereof. Such copolymers and/or terpolymers generally contain from about 2 to 7 weight % ethylene and about 2 to 7 weight % 1-butene.

Each surface or skin layer of HDPE generally comprises about 2 to 15%, preferably about 2 to 5%, of the overall thickness of the film although thicker layers could be used to prepare a stiffer film or a film with better water barrier properties.

The multi-layer film structures of this invention may be prepared by coextrusion, extrusion coating or casting methods known in the art. The coextrusion of HDPE with polypropylene, like other coextrusions, requires the proper matching of polymer viscosities and flow velocities in the die. It has been found that this can be accomplished by pairing low melt flow (1.9-2.5) polypropylene resins with comparable melt index (1-3.0) HDPE resins. It is also possible to improve the flow compatibility of the two resins through extrusion condition changes. It has been found that the HDPE/polypropylene coextrusion can be most successfully cast onto a cast roll having a temperature of about 140° to 160° F.

The multi-layer film structures of this invention are oriented, generally biaxially, for added strength and enhanced properties. Generally, the films are stretched about 300-700% in the machine direction and about 500-900% in the transverse direction. As indicated previously, it has been found to be critical, for preparing a film with low haze and high gloss, to orient the film structure at a temperature above the melting point of the HDPE layer and below the melting point of the polypropylene layer. To achieve best results, the film should also be rapidly quenched after orientation. Orientation of a HDPE/polypropylene film according to this invention has been successfully achieved at oven temperatures in the range of about 260° to 320° F.

The best mode contemplated by the inventors for preparing the films of this invention can be described as follows: Polypropylene homopolymer resin (melt flow 3-4) is fed into the main extruder of an A/B coextrusion system while HDPE resin (melt index 3.0) is fed into the satellite extruder. The ratio of these materials is 95/5. The melt temperature of the polypropylene is 490° F. while that of the HDPE is 495° F. The molten materials are joined in a multicavity die and cast onto a polished chrome chill roll with a set point of 140° F. The cast sheet is 30 mils thick and enters a water bath (100° F). Following this initial quench, the sheet is reheated to 270° F. and stretched in the machine direction five times. The thinned sheet is then fed into a tenter frame where it is preheated at a temperature of 335° F. and stretched eight times in the transverse direction. It is heat set at 300° F., trimmed and wound into a roll.

Multi-layer film structures can be prepared according to this invention which exhibit coefficients of friction of below 0.40, generally within the range of about 0.30-0.40, good gloss (greater than about 80) and low haze (less than about 3.0) without the use of migratory or non-migratory additives to the polypropylene or its surface. These films possess the unique ability to develop weld bonds between the film and laminate when used in extrusion lamination with low density polyethylene. They also offer a unique slip surface for metallization as well as a surface which accepts water and solvent based inks when surface treated in a manner known to the art.

This invention is further illustrated in the following examples which are intended to be representative only and not limiting of the invention. In these examples, the polypropylene resins used are designated as follows:
PP-1 = Melt flow 4
PP-2 = Melt flow 6
PP-3 = Melt flow 2.5
PP-4 = Melt flow 1.95
PP-5 = Melt flow 3
The HDPE resins used are designated as follows:
HDPE-1 = Melt index 1.1
HDPE-2 = Melt index 3.0

The oriented polypropylene film used as a comparison in several of the examples, PP, is Bicor(R) LCM-W Oriented Polypropylene Film, available from Mobil Chemical Company, 1150 Pittsford-Victor Road, Pittsford, N.Y.

Test results presented in the examples were obtained using the following test procedures:
Haze - ASTM D1003
Gloss - ASTM D2457
Film to Film Coefficient of Friction (COF) - ASTM D1894
Film to Steel Coefficient of Friction (COF) - ASTM D1894
Force-over-the-forming-collar (FOFC) - A packaging structure is pulled through a MIRA-PAK vertical form fill and seal machine over a polished 11¼" forming collar. The film is attached to a Hanson gauge while pulling which has a 0-50 lb. scale with 1 lb. increments.
Bond Strength - During lamination, a paper sheet is inserted between layers. These separated layers are used as the tails to be gripped in the Instron where the actual strength is measured.
Dyne Solution Test - ASTM D2378

EXAMPLES 1-17

Biaxially oriented multi-layer HDPE/polypropylene film structures were prepared by coextruding the polymers and orienting the cast film at a temperature above the melting point of the HDPE and below that of the polypropylene as described above. The optical characteristics for a number of these films are presented in Table 1.

TABLE 1

| Ex. | Structure | Layer Thicknesses | Haze | Gloss |
|---|---|---|---|---|
| 1 | HDPE-1/PP-1/HDPE-1 | 5/90/5 | 1.7 | 81.5 |
| 2 | " | " | 3.0 | 84.8 |
| 3 | " | " | 1.8 | 90.1 |
| 4 | " | " | 2.6 | 86.4 |
| 5 | HDPE-1/PP-2/HDPE-1 | " | 6.2 | 9.3 |
| 6 | HDPE-1/PP-1/HDPE-1 | " | 1.0 | 79.2 |
| 7 | " | " | 0.9 | 93.6 |
| 8 | HDPE-1/PP-3/HDPE-1 | " | 0.9 | 93.2 |
| 9 | PP-5/HDPE-1 | 95/5 | 2.4 | 94.8 |
| 10 | " | " | 2.3 | 96.7 |
| 11 | " | " | 1.9 | 85.5 |
| 12 | " | " | 2.4 | 78.0 |
| 13 | " | " | 3.7 | 84.6 |
| 14 | " | " | 1.7 | 85.7 |
| 15 | PP-3/HDPE-1 | " | 1.9 | 87.5 |
| 16 | PP-4/HDPE-2 | " | 1.0 | 89.6 |
| 17 | " | " | 1.6 | 92.6 |

EXAMPLE 18

Coextruded biaxially oriented PP/HDPE film structures according to this invention were extrusion laminated to other films and tested for machinability and bond strength as well as coefficient of friction. The film structures of this invention which were tested are identified as follows:

Film A = HDPE-1/PP-1/HDPE-1
Film B = HDPE-1/PP-1/HDPE-1
Film C = HDPE-1/PP-3/HDPE-1
Film D = PP-5/HDPE-1
Film E = PP-5/HDPE-1
Film F = PP-5/HDPE-1
Film G = PP-5/HDPE-1
Film H = HDPE-2/PP-5/(ethylene/propylene copolymer)

In the A/B or A/B/C film structures, Films A-C and H, the HDPE layer comprises about 2 - 5% of the overall thickness of the film. In the A/B/A structures, the total HDPE layers comprise about 5 - 10 % of the overall thickness of the film. Although a number of the film structures comprise the same polymer layers (e.g., Films A and B), they are designated separately because they were prepared at different times in different runs.

The coextruded film structures of this invention or, for purposes of comparison, a biaxially oriented polypropylene film (PP), were extrusion laminated with low density polyethylene films (LDPE) to either glassine or PXS, optionally being coated with polyethylene imine primer. The results of machinability and bond strength tests are presented in Table 2.

TABLE 2

| Structure | FOFC lbs. | COF Film-Film | COF Film-Steel | Bond Strgth g/in |
|---|---|---|---|---|
| Trial 1 | | | | |
| (1)Film A/LDPE/PXS** | —0.31 | — | 82.6 | |
| (2)PP/LDPE/Primer/Glassine | — | — | — | 6.5 |
| Trial 2 | | | | |
| (3)Film B/LDPE/Primer/Glassine | 41 | 0.51 | 0.23 | 350* |
| (4)Film A/LDPE/Primer/Glassine | 20 | 0.52 | 0.19 | 348* |
| (5)PP/LDPE/Primer/Glassine | >50 | 0.31 | 0.22 | 51 |
| Trial 3 | | | | |
| (6)Film C/LDPE/Glassine | 20 | 0.39 | — | — |
| (7)Film D/LDPE/Glassine | 18 | 0.37 | — | — |
| (8)Film E/LDPE/Glassine | 17 | 0.34 | — | — |
| (9)Film F/LDPE/Glassine | 15 | 0.36 | — | — |
| (10)PP/LDPE Glassine | 38 | 0.33 | — | — |
| (11)Film G/LDPE/PXS** | 14 | 0.40 | — | — |
| (12)PP/LDPE/PXS | 17 | 0.34 | — | — |
| Trial 4 | | | | |
| (13)Film H/LDPE/Primer/Glassine (HDPE out) | 18 | 0.37 | 0.17 | Inseparable |
| (14)Film H/LDPE/Primer/Glassine (HDPE buried) | 38 | 0.45 | 0.22 | Inseparable |
| (15)PP/LDPE/Primer/Glassine | 40 | 0.31 | 0.22 | 142 |

*Paper tore at this strength, so bond was stronger than this.
**PXS = saran coated polypropylene film The data presented in Table 2 indicate that in all cases, the oriented HDPE/PP film structures of this invention outperformed the oriented PP film structures in the force-over-the-forming-collar (FOFC) test. In all but one test, the film structures of this invention produced FOFC of 20 lbs. or less. FOFC of 25 lbs. or less is considered to be good machinability. The PP film performed in its usual range of 38 to +50 lbs. The HDPE/PP film structures performed as well in the PXS lamination as the PP films. The reason for the poor performance of Film Structure 3 is not known but may be due to uneven skin distribution experienced during parts of the early run.

The other test for machinability, film to film COF, indicated slightly higher coefficients of friction for the film structures of the invention than for the PP film laminations.

The data in Table 2 also show that the HDPE skins of the films of this invention have excellent bonds in LDPE extrusion laminations. In Trial 1, the extrusion temperatures were low, resulting in poor bond strengths. The PP lamination, which would normally have a bond of 25–40 g/in., had a bond strength of only 6.5 g/in. Other variables run during that trial had similarly low bond strengths. Despite the poor processing conditions, the HDPE skin film had a bond strength of 82.6 g/in.

In Trial 3, normal lamination conditions were run and a slightly higher than normal PP bond of 51 g/in was measured compared to the 350 g/in. bonds for the HDPE skin films. In addition, the 350 g/in. was the strength of the face of the glassine tearing with the actual film to poly bond strength being even greater.

The extrusion temperatures were run hot in Trial 4 which, it is believed, is why the bond strengths were higher for all variables.

EXAMPLE 19

A film structure according to this invention, a coextrusion of PP-5/HDPE-1 (Film G), was tested in adhesive laminations to PXS and compared to laminations with oriented PP film. For these laminations, the HDPE side of the film structure was buried. To test for bond strength, two substrates were joined together at a nip point under pressure and heat. The first substrate was coated with adhesive and then dried. The coated substrate was then joined to the second substrate at a high pressure heated nip. Bond strengths were measured initially and after aging. The adhesives used were either a polyvinylidene chloride (PVdC), a urethane, or Duro-Flex 56 (composition unknown, available from National Starch and Chemical Corporation, Bridgewater, NJ). The results are presented in Table 3.

TABLE 3

| | Bond Strength (g/in.) | |
|---|---|---|
| Structure | Initial | 2 Week Aged |
| Film G/PVdC/PXS | 186 | 147 |
| PP/PVdC/PXS | 122 | 120 |
| Film G/Urethane/PXS | 458 | 357 |
| PP/Urethane/PXS | 482 | Tear |
| Film G/Duro-Flex 56/PXS | 262 | 198 |
| PP/Duro-Flex 56/PXS | 293 | 107 |

The results in Table 3 indicate that the PVDC bond strengths of the HDPE skin film of this invention are better than those of the PP film. The urethane bonds were slightly lower on the HDPE skin films, but they were still well within the fitness-for-use range. The Duro-Flex 56 bonds were very good.

EXAMPLE 20

High density polyethylene has a reputation for being an easy to treat substrate. This was verified by tests on A/B film structures of polypropylene (melt flow 2.25)/HDPE (melt index 1.1). The results are presented in Table 4.

TABLE 4

| Power Setting | Dyne Sol. Test (dyne/cm) | Contact Advan. | Angle Reced. | Block.[1] | Ink Block[2] |
| --- | --- | --- | --- | --- | --- |
| Not treated | 31 | 99.5 | 92.0 | 1.6 | 6.2 |
| 60 V., 2a. | 33+ | 80.8 | 73.8 | 1.5 | 24.8 |
| 105 V., 4.4a. | 39 | 61.0 | 43.3 | 25.2 | 33.1 |
| 150 V., 6.4a. | 42 | 62.3 | 31.0 | 35.7 | 31.4 |
| 185 V., 12a. | 54— | 58.0 | 14.0 | 46.0 | 24.1 |

[1] One hour block test at 750 psi, 140° F.
[2] Three day ink block test at 100 psi, 125° F.

The data in Table 4 illustrate that a level of 42 dyne/cm was achieved at a power setting of 150V., 6.4a., the same power setting normally used to treat oriented homopolymer polypropylene film to 36–37 dynes/cm. A value as high as 54- was measured on one sample.

EXAMPLE 21

Several film structures according to this invention were evaluated for waterbased ink blocking using the following test. Ink (CZ Aqualam P waterbased ink) was placed on the film and drawn down using a Meyer Rod metering system and then dried thoroughly. The sample was then placed in a standard 3-day blocking test at 100 psi, 125° F. The test was run treated side to printed treated side. Separation bond strength was measured using an Inston machine. The results are presented in Table 5.

TABLE 5

| Film Structure | Ink Blocking (g/in.) | Comments |
| --- | --- | --- |
| PP-5/HDPE-1 | 24.8 | 33+ dyne/cm |
| " | 33.1 | 39 dyne/cm |
| " | 31.4 | 42 dyne/cm |
| " | 24.1 | 54— dyne/cm |
| " | 6.2 | 31 dyne/cm |
| PP | 55.7* | 36 dyne/cm |
| PP | 58.5** | 36 dyne/cm |
| PP-1/HDPE-1 | 33.1 | N.A. |
| PP-1/HDPE-1 | 18.8 | N.A. |

*Avg. of 2 tests
**Avg. of 10 tests

The data in Table 5 show the HDPE films of this invention to have a blocking force of 24–33 g/in compared to PP films with an average of 58.5 g/in. This is a 50% decrease in blocking force.

What is claimed is:

1. An oriented multi-layer film comprising at least a first surface layer of a material consisting essentially of HDPE and a second layer of a material consisting essentially of polypropylene, said film being oriented by stretching at a temperature above the melting point of the material of said first surface layer and below the melting point of the material of said second layer.

2. The film of claim 1 where said first surface layer is HDPE.

3. The film of claim 1 where said second layer is polypropylene.

4. The film of claim 2 where said second layer is polypropylene.

5. The film of claim 1 wherein said first surface layer comprises about 2 to 15 % of the thickness of the overall film.

6. The film of claim 5 wherein said first surface layer comprises about 2 to 5 % of the thickness of the overall film.

7. The film of claim 1 which further comprises a second surface layer of HDPE.

8. The film of claim 1 which further comprises a second surface layer selected from ethylene/propylene copolymer, terpolymer or a blend thereof.

9. The film of claim 1 where said first surface layer is HDPE having a melt index of about 0.5–18 and said second layer is polypropylene having a melt flow of about 1–8.

10. The film of claim 9 where said first surface layer comprises about 2 to 15 % of the thickness of the overall film.

11. The film of claim 9 which exhibits a coefficient of friction of less than 0.40.

12. The film of claim 9 which exhibits gloss of greater than about 80 and haze of less than about 3.0.

13. The film of claim 11 which exhibits gloss of greater than about 80 and haze of less than about 3.0.

14. A method of preparing an oriented multi-layer polypropylene film having low coefficient of friction and good optical properties comprising stretching a multi-layer film comprising at least a first surface layer of a material consisting essentially of HDPE and a second layer of a material consisting essentially of polypropylene at a temperature above the melting point of the material of said first surface layer and below the melting point of the material of said second layer.

15. The method of claim 1 where said first surface layer is HDPE.

16. The method of claim 14 where said second layer is polypropylene.

17. The method of claim 15 where said second layer is polypropylene.

18. The method of claim 14 where said first surface layer comprises about 2 to 15 % of the thickness of the overall film.

19. The method of claim 18 where said first surface layer comprises about 2 to 5 % of the thickness of the overall film.

20. The method of claim 14 which further comprises a third surface layer of HDPE adjacent to said second layer.

21. The method of claim 14 where said first surface layer is HDPE having a melt index of about 0.5–18 and said second layer is polypropylene having a melt flow of about 1–8.

22. The method of claim 21 where said first surface layer comprises about 2 to 5% of the thickness of the overall film.

23. The method of claim 21 in which said film exhibits a coefficient of friction of less than 0.40.

24. The method of claim 21 in which said film exhibits gloss of greater than about 80 and haze of less than about 3.0.

25. The method of claim 23 in which said film exhibits gloss of greater than about 80 and haze of less than about 3.0.

* * * * *

UNITED STATES PATENT AND TRADEMARK OFFICE
CERTIFICATE OF CORRECTION

PATENT NO. : 4,855,187

DATED : August 8, 1989

INVENTOR(S) : Wayne R. Osgood, Jr. and Matthew A. Therrian

It is certified that error appears in the above-identified patent and that said Letters Patent is hereby corrected as shown below:

Column 5, line 37, line 1 of Table 2 should read --

| FOFC lbs. | Film-Film | Film-Steel | Bond Strgth g/in |   |
|---|---|---|---|---|
| -- | 0.31 | -- | 82.6 | --. |

Column 7, line 62, before the period add --and exhibits a coefficient of friction of less than 0.52--.

Signed and Sealed this

Eleventh Day of September, 1990

Attest:

HARRY F. MANBECK, JR.

Attesting Officer     Commissioner of Patents and Trademarks